(12) United States Patent
Riley (10) Patent No.: US 7,689,984 B2
(45) Date of Patent: Mar. 30, 2010

(54) CLIENT-SERVER DATA EXECUTION FLOW

(75) Inventor: Ryan Riley, Meridian, ID (US)

(73) Assignee: Autonomic Software, Inc., Danville, CA (US)

( * ) Notice: Subject to any disclaimer, the term of this patent is extended or adjusted under 35 U.S.C. 154(b) by 1693 days.

(21) Appl. No.: 10/763,808

(22) Filed: Jan. 22, 2004

(65) Prior Publication Data

US 2005/0166197 A1 Jul. 28, 2005

(51) Int. Cl.
*G06F 9/44* (2006.01)
*G06F 15/177* (2006.01)
(52) U.S. Cl. ................................ 717/173; 709/220
(58) Field of Classification Search ................ None
See application file for complete search history.

(56) References Cited

U.S. PATENT DOCUMENTS 6,606,744 B1 8/2003 Mikurak

OTHER PUBLICATIONS

Concepts, Planning, and Deployment Guide, MicrosoftâSystems Management Server 2003. Microsoft Corporation. Oct. 2003 (pp. 72-79, 130-132.*

Understanding Patch and Update Management: Microsoft's Software Update Strategy. Microsoft Corporation. Oct. 1, 2003.*
Microsoft White Paper, "Understanding Patch and Update Management: Microsoft's Software Update Strategy", Microsoft Corporation, pp. i-iii, 1-14 (Oct. 2003).
Keromytis, et al., "A Holistic Approach to Service Survivability", ACM, pp. 11-22 (Oct. 2003).
Sidiroglou et al., "A network work vaccine architecture", IEEE, pp. 1-6 (Jun. 2003).
International Search Report, PCT/US2005/01547, dated Aug. 24, 2006.

* cited by examiner

*Primary Examiner*—James Rutten
(74) *Attorney, Agent, or Firm*—Nixon Peabody LLP (57) ABSTRACT

A system may scan various reporting services and application manufacturers' websites for recent security upgrades, hot fixes, and service packs. The system may then retrieve these patches and automatically apply these patches on every computer within the corporate network. A server and/or a client may each run a web module, a main module, and a patch module. The modules may interact with each other, and with a user interface and/or database through a listen-process-respond procedure. This ensures effective communication between users requesting patch updates and servers providing the patches themselves.

38 Claims, 9 Drawing Sheets

FIG. 1

```xml
<?xml version="1.0" ?>
<GURtransfer>
  < McVendors>
    <McVendor McVendorID="1">
      <VendorID></VendorID>
      <VendorName></VendorName>
      <VendorDescription ></VendorDescription>
      <VendorStatus></VendorStatus>
    </McVendor>
  </McVendors>
  <McOSPackages>
    <McOSPackage McOSPackageID="1">
      <McOSPackageID></McOSPackageID >
      <VendorID></VendorID >
      <McOSPackageName></McOSPackageName>
      <McOSPackageVersion></McOSPackageVersion>
      <McOSPackegeDescription></McOSPackegeDescription>
      <McOSPackegeRemoteLocation></McOSPackegeRemoteLocation>
      <McOSPackegeDate></McOSPackegeDate>
      <McOSPackegeStatus></McOSPackegeStatus>
    </McOSPackage>
  </McOSPackages>
  <McSoftwarePackeges>
    <McSoftwarePackege McSoftwarePackegeID="1">
      <McSoftwarePackageID></McSoftwarePackageID>
      <VendorID></VendorID>
      <McSoftwarePackageName></McSoftwarePackageName>
      <McSoftwarePackageVersion></McSoftwarePackageVersion>
      <McSoftwarePackegeDescription></McSoftwarePackegeDescription>
      <McSoftwarePackegeRemoteLocation></McSoftwarePackegeRemoteLocation>
      <McSoftwarePackegeDate></McSoftwarePackegeDate>
      <McSoftwarePackegeStatus></McSoftwarePackegeStatus>
    </McSoftwarePackege>
  </McSoftwarePackeges
</GURtransfer>
```

FIG. 2

McVendors

| Column Name | Data Type | Length | Nulls |
|---|---|---|---|
| VendorID | Int | 4 | |
| VendorName | VarChar | 150 | |
| VendorURL | VarChar | 150 | |
| VendorDescription | Text | 10 | X |
| VendorDate | Datetime | 8 | |
| VendorType* | Int | 4 | |
| VendorStatus | Bit | 1 | |

300

McOSPackages

| Column Name | Data Type | Length | Nulls |
|---|---|---|---|
| McOSPackageID | Int | 4 | |
| VendorID | Int | 4 | |
| McOSPackageName | VarChar | 150 | X |
| McOSPackageVersion | VarChar | 50 | |
| McOSPackegeDescription | Text | 10 | X |
| McOSPackegeRemoteLocation | VarChar | 250 | |
| McOSPackegeLocalLocation | VarChar | 250 | |
| McOSPackegeDate | Datetime | 8 | |
| McOSPackegeStatus | Bit | 1 | |

McSoftwarePackages

| Column Name | Data Type | Length | Nulls |
|---|---|---|---|
| McSoftwarePackageID | Int | 4 | |
| VendorID | Int | 4 | |
| McSoftwarePackageName | VarChar | 150 | X |
| McSoftwarePackageVersion | VarChar | 50 | |
| McSoftwarePackegeDescription | Text | 10 | X |
| McSoftwarePackegeRemoteLocation | VarChar | 250 | |
| McSoftwarePackegeLocalLocation | VarChar | 250 | |
| McSoftwarePackegeDate | Datetime | 8 | |
| McSoftwarePackegeStatus | Bit | 1 | |

FIG. 3 lcComputers

| Column Name | Data Type | Length | Nulls |
|---|---|---|---|
| lcComputerID | Int | 4 | |
| lcComputerName | Int | 4 | X |
| lcComputerIPAddress | VarChar | 150 | |
| lcComputerOsName | VarChar | 50 | |
| lcComputerOSVersion | VarChar | 50 | | lcSoftware

| Column Name | Data Type | Length | Nulls |
|---|---|---|---|
| lcSoftwareID | Int | 4 | |
| lcComputerID | Int | 4 | |
| lcSoftwareName | VarChar | 150 | X |
| lcSoftwareDescription | Text | 10 | X |
| lcSoftwareVersion | VarChar | 50 | |
| lcSoftwareInstalledLocation | VarChar | 250 | |
| lcSoftwareUpdateable | Bit | 1 | |
| lcSoftwareUpdateType* | Int | 4 | |
| lcSoftwareUpdateTime** | Int | 4 | |
| lcSoftwareDate | Datetime | 8 | |
| lcSoftwareStatus | Bit | 1 | |

400 lcVendors

| Column Name | Data Type | Length | Nulls |
|---|---|---|---|
| lcVendorID | Int | 4 | |
| lcVendorName | VarChar | 150 | |
| lcVendorURL | VarChar | 150 | |
| lcVendorDescription | Text | 10 | X |
| lcVendorDate | Datetime | 8 | |
| lcVendorType* | Int | 4 | |
| lcVendorStatus | Bit | 1 | |

FIG. 4A

IcOSPackages

| Column Name | Data Type | Length | Nulls |
|---|---|---|---|
| IcOSPackageID | Int | 4 | |
| VendorID | Int | 4 | |
| IcOSPackageName | VarChar | 150 | X |
| IcOSPackageVersion | VarChar | 50 | |
| IcOSPackegeDescription | Text | 10 | X |
| IcOSPackegeRemoteLocation | VarChar | 250 | |
| IcOSPackegeLocalLocation | VarChar | 250 | |
| IcOSPackegeDate | Datetime | 8 | |
| IcOSPackegeStatus | Bit | 1 | |

IcSoftwarePackages

| Column Name | Data Type | Length | Nulls |
|---|---|---|---|
| IcSoftwarePackageID | Int | 4 | |
| VendorID | Int | 4 | |
| IcSoftwarePackageName | VarChar | 150 | X |
| IcSoftwarePackageVersion | VarChar | 50 | |
| IcSoftwarePackegeDescription | Text | 10 | X |
| IcSoftwarePackegeRemoteLocation | VarChar | 250 | |
| IcSoftwarePackegeLocalLocation | VarChar | 250 | |
| IcSoftwarePackegeDate | Datetime | 8 | |
| IcSoftwarePackegeStatus | Bit | 1 | |

IcOSPackagesUpdatedByComputer

| Column Name | Data Type | Length | Nulls |
|---|---|---|---|
| IcOSUpdateID | Int | 4 | |
| IcComputerID | Int | 4 | |
| IcOSPackageID | Int | 4 | |
| IcOSPackaagesUpdatedDate | Datetime | 8 | |

IcSoftwarePackagesUpdatedByComputer

| Column Name | Data Type | Length | Nulls |
|---|---|---|---|
| IcOSUpdateID | Int | 4 | |
| IcComputerID | Int | 4 | |
| IcSoftwarePackageID | Int | 4 | |
| IcSoftwarePackaagesUpdatedDate | Datetime | 8 | |

FIG. 4B

| DcOSJobQueue | | | |
|---|---|---|---|
| Column Name | Data Type | Length | Nulls |
| DcOSJobID | Int | 4 | |
| IcComputerID | Int | 4 | |
| IcOSPackageID | Int | 4 | |
| DcOSJobType* | Int | 4 | |
| DcOSJobTime** | Int | 4 | |
| DcOSJobStatus*** | Int | 4 | |

500

| DcSoftwareJobQueue | | | |
|---|---|---|---|
| Column Name | Data Type | Length | Nulls |
| DcSoftwareJobID | Int | 4 | |
| IcComputerID | Int | 4 | |
| IcSoftwarePackageID | Int | 4 | |
| DcSoftwareJobType* | Int | 4 | |
| DcSoftwareJobTime** | Int | 4 | |
| DcSoftwareJobStatus*** | Int | 4 | |

CLIENT-SERVER DATA EXECUTION FLOW

CROSS REFERENCE TO RELATED APPLICATION

This application is related to co-pending U.S. patent application Ser. No. 10/763,814, entitled "Distributed Policy Driven Software Delivery" by Anthony F. Gigliotti and Ryan Riley, filed on Jan. 22, 2004.

FIELD OF THE INVENTION

The present invention relates to the field of software updates. More specifically, the present invention relates to a client-server data execution flow used in modules within a distributed application.

BACKGROUND OF THE INVENTION

The rise of Internet attacks via computer viruses and other techniques has caused significant financial damage to many corporations. Current anti-virus software operates by comparing incoming files against a list of "offensive" code (e.g., known viruses). If a file looks like one of these offensive codes, then it is deleted and the system protected. There are several major problems with this approach, however, with regard to modern virus attacks.

First, if the virus is new and not in the list of known viruses, the anti-virus solution will not identify it is a virus and therefore it will not keep it from spreading. Second, modern worms such as "code red" and "SQL slammer" do not rely on any of the methods of transmission guarded by most virus protection systems. These new strands of viruses are designed to attack the computer system directly by exploiting faults in the software used by the computer to perform its operations. The viruses are therefore able to crack corporate networks and replicant without the intervention of anti-virus software.

Another critical factor in preventing anti-virus software from protecting modern networks is the speed of modern virus replication and propagation. Whereas years ago it could take years for a virus to disseminate across the United States, modern viruses can spread across the whole world in a matter of minutes.

At the root of the modern virus problem lies system management and maintenance. All network applications are vulnerable to some level of attack, but the software manufacturers work diligently to resolve these errors and release fixes to the problems before they can be exploited by virus producers. In fact, most of the time the application manufacturers have released the fixes to the application that would have prevented a virus from utilizing these holes before the viruses are even released. Unfortunately, due to the complexity of modern networks, most system administrators are unable to keep pace with the increasing number of security patches and hot fixes released from the software manufacturers on every computer in the network.

What is needed is a solution that automates the process of identifying and managing network application security holes. What is also needed is a mechanism that allows distributed portions of the solution to communicate with each other in an effective manner.

BRIEF DESCRIPTION

A system may scan various reporting services and application manufacturers' websites for recent security upgrades, hot fixes, and service packs. The system may then retrieve these patches and automatically apply these patches on every computer within the corporate network. A server and/or a client may each run a web module, a main module, and a patch module. The modules may interact with each other, and with a user interface and/or database through a listen-process-respond procedure. This ensures effective communication between users requesting patch updates and servers providing the patches themselves.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In an embodiment of the present invention, the system may scan various reporting services and application manufacturers' websites for recent security upgrades, hot fixes, and service packs. The system may then retrieve these patches and automatically apply these patches on every computer within the corporate network. By inoculating systems before viruses are able to take advantage of their weaknesses, corporations can prevent many of the modern viruses from entering their network and reduce their corporate losses. Furthermore, as a sufficient amount of network and system administrator time is currently utilized on keeping track of security fixes, downloading these patches, and applying them across the corporate network, the implementation of this solution saves money and resources.

An Inoculation Server (IS) may be utilized to contact the various security websites, determine what vulnerabilities need to be resolved, download the security patches, and apply them to every computer in the organization. The IS platform may be a highly scalable, distributed solution. A client in the system may be defined as any system that has the client side application installed, which allows the IS to remotely distribute security and other application updates. The security websites may include non-profit organizations like the Internet Security Alliance (ISA), vendor websites, and media technology web sites such as ZDNET, etc.

Figure 1:
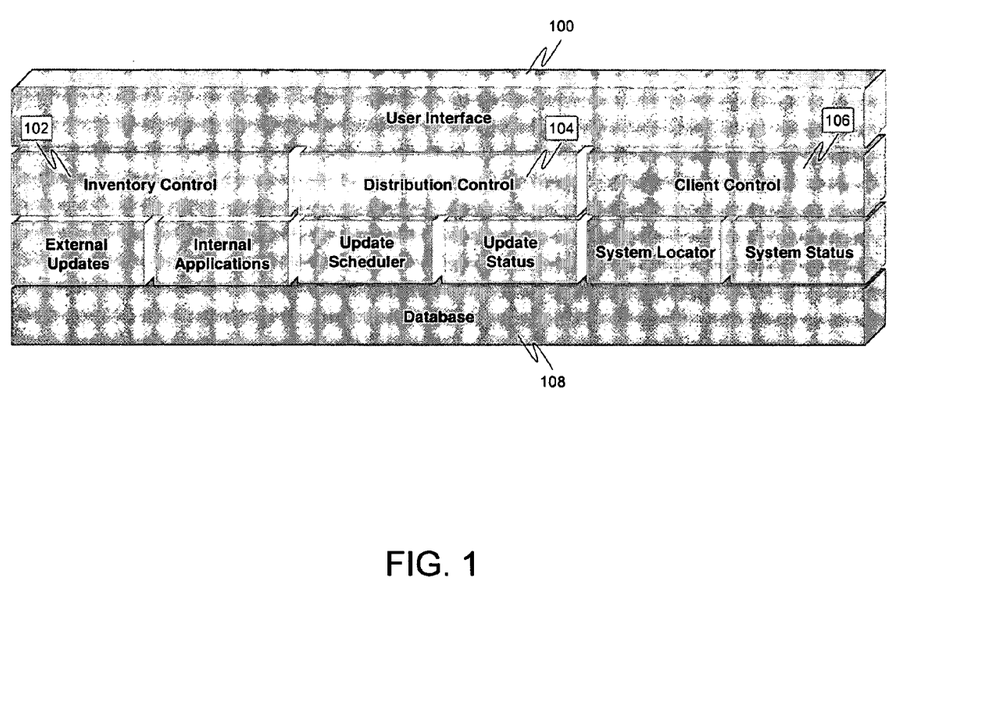
FIG. 1 is a diagram illustrating an Inoculation Server platform in accordance with an embodiment of the present invention.

FIG. 1 is a diagram illustrating an Inoculation Server platform in accordance with an embodiment of the present invention. A user interface 100 may be provided to manage the reporting of security updates, client applications, distribution properties, client location and status, as well as to set and manage all other aspects of the IS platform. An inventory control engine 102 may be used to scan for application updates with the Global Update Repository (GUR) and compare them with the client through a client status report.

Figure 2:
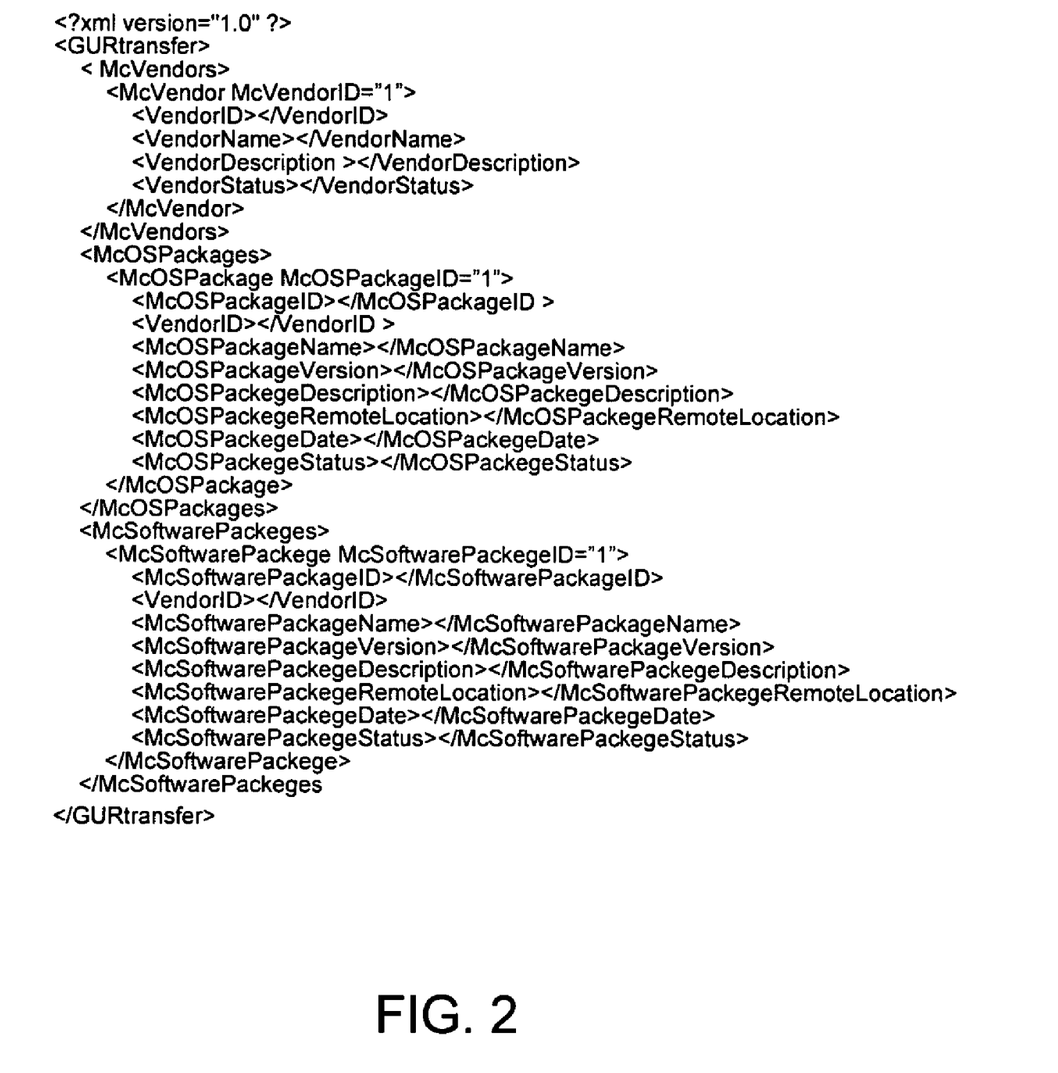
FIG. 2 is a diagram illustrating an example of an XML document containing new external update information in accordance with an embodiment of the present invention.

The GUR is a centralized repository that manages all the updates for all operating systems and software packages to be delivered to all the installed inoculation servers. It may utilize standard Internet servers and basic web spiders to mine, retrieve, and archive external update information. In an embodiment of the present invention, the GUR may comprise one or more Windows 2000 servers with .NET and a SQL database. The GUR components may include a user-interface to manage and report on external package updates available within the GUR. This interface may allow user to create accounts and manually view and download update packages. The users may also request a notification, via email, when an update is available. The GUR components may also include a GUR spider, which may scan available online resources for new updates to supported software, and an IS connection engine, which may communicate, via Extensible markup Language (XML), to registered ISs the availability of new software and OS update packages. The communication between the GUR and the IS may be passed through an HTTP GET or POST command. The new external update information may be passed via an XML document. FIG. 2 is a diagram illustrating an example of an XML document containing new external update information in accordance with an embodiment of the present invention.

Figure 3:
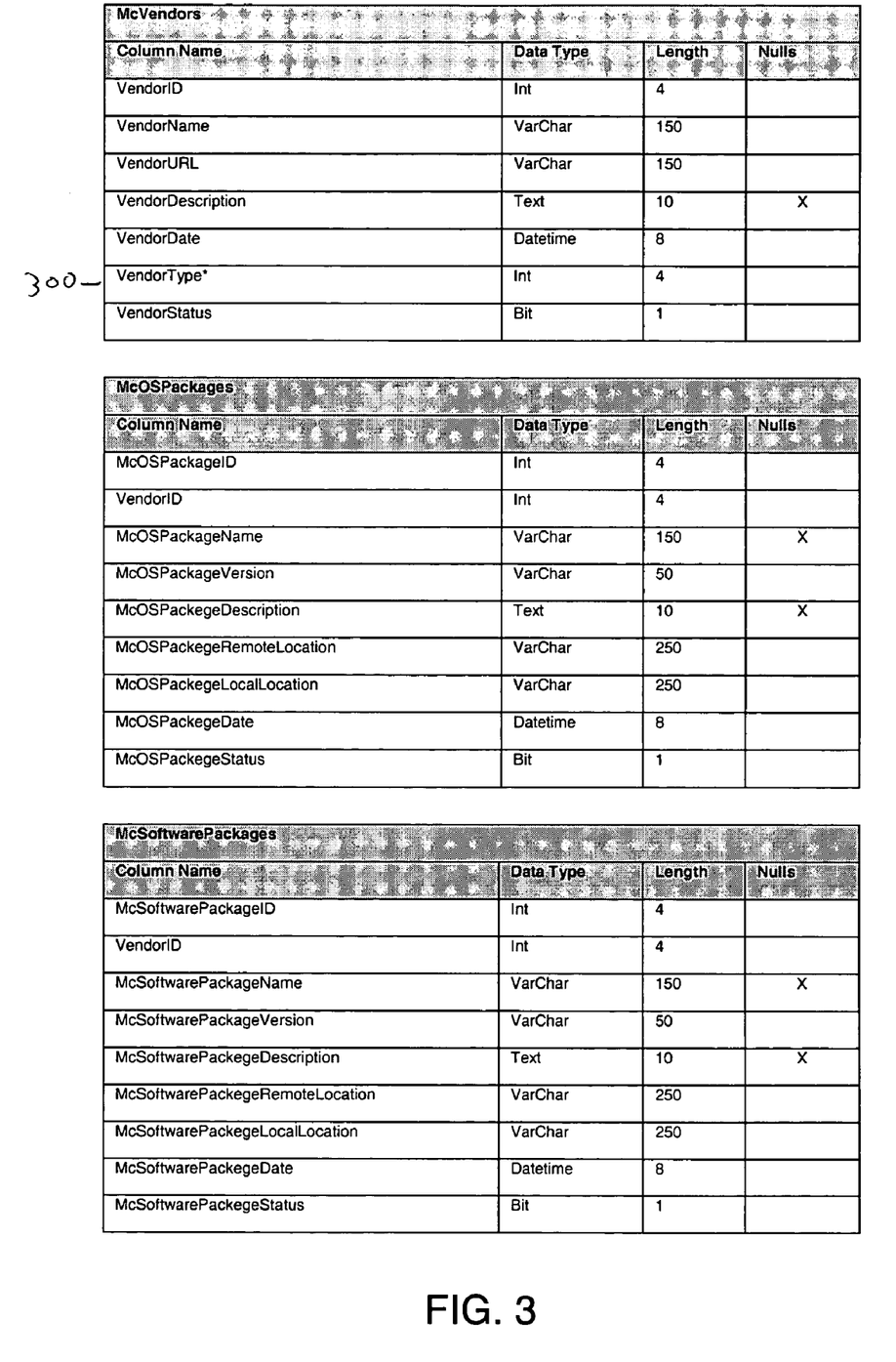
FIG. 3 is a diagram illustrating an outline of external update package tables in accordance with an embodiment of the present invention.

The GUR database may comprise several database tables used to manage user accounts and external update packages available for distributions. The user tables may comprise basic login and contact information, account tracking and history information, as well as account type and states. FIG. 3 is a diagram illustrating an outline of external update package tables in accordance with an embodiment of the present invention. The vendor type field 300 may be a flag used to communicate to the system what type of vendor this is. The vendor types may be automatic download and release, automatic download and manually confirm release, and manually download and confirm.

Figure 4A:
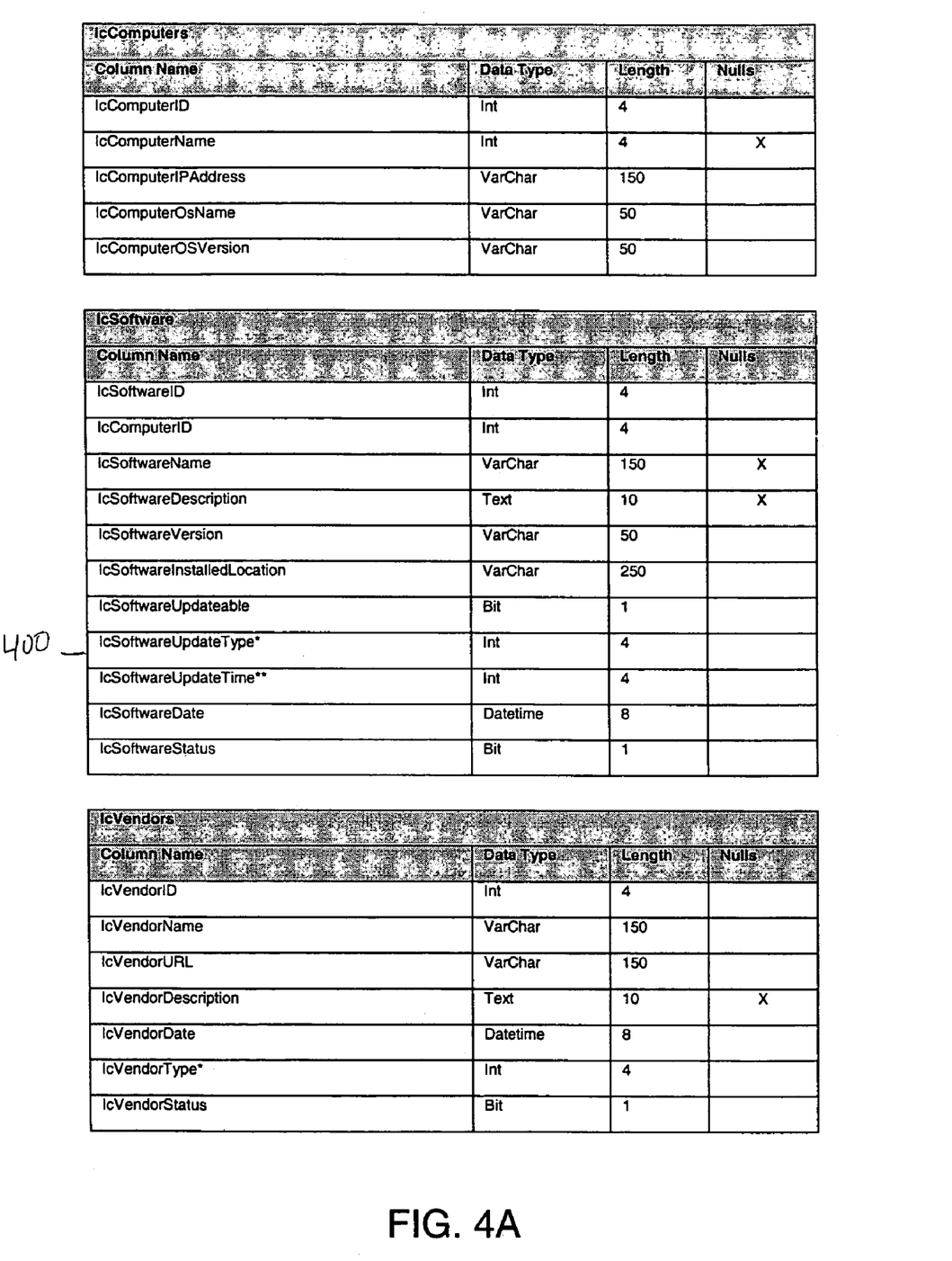
FIGS. 4A and 4B are diagrams illustrating an outline of inventory control tables in accordance with an embodiment of the present invention.
Figure 4B:
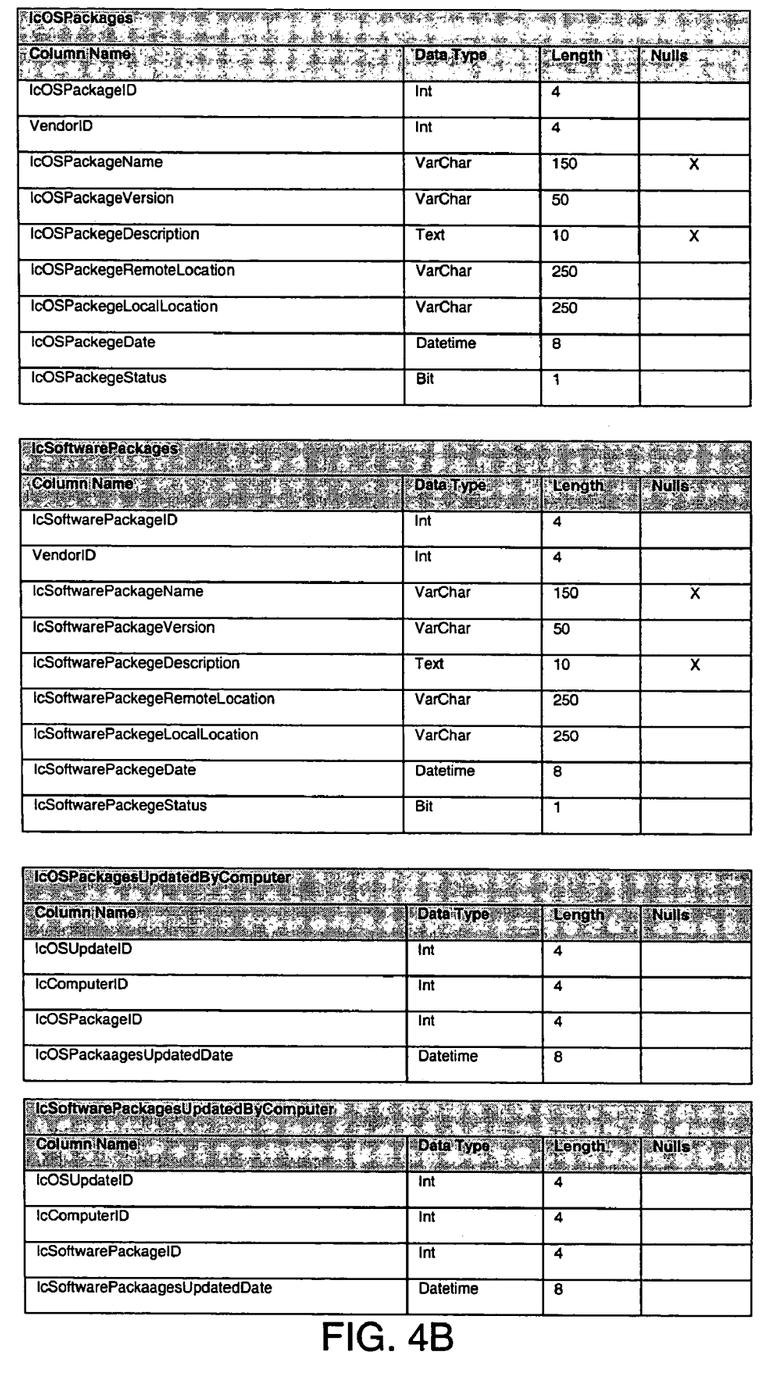

The inventory control engine 102 may have its own SQL database comprised of several database tables used to manage external update package availability for distribution and client application version information. FIGS. 4A and 4B are diagrams illustrating an outline of inventory control tables in accordance with an embodiment of the present invention. The ICSoftwareUpdateType field 400 may be a flag used to communicate to the system what type of application takes. Choices may include automatic immediate, automatic default update time, manual update with notification, and manual update without notification.

A distribution engine 104, notified by the inventory control engine 102, may schedule external package installations and record the status of all client updates. A client control module 106 may have both internal and external components. The external component may be called the Inoculation Client (IC). The IC is a client side application installed on servers or workstations throughout an organization that communicates to the client control module 106. The IC passes to the IS the clients availability on the network and sends a status report to the inventory control module. The IC also queries the database and initiates any jobs that might be available. Once a job is identified, the IC may download the update package and initiate the installation through the use of a command line interface. Once an update is applied, the IC may communicate back to the IS via XML.

Figure 5:
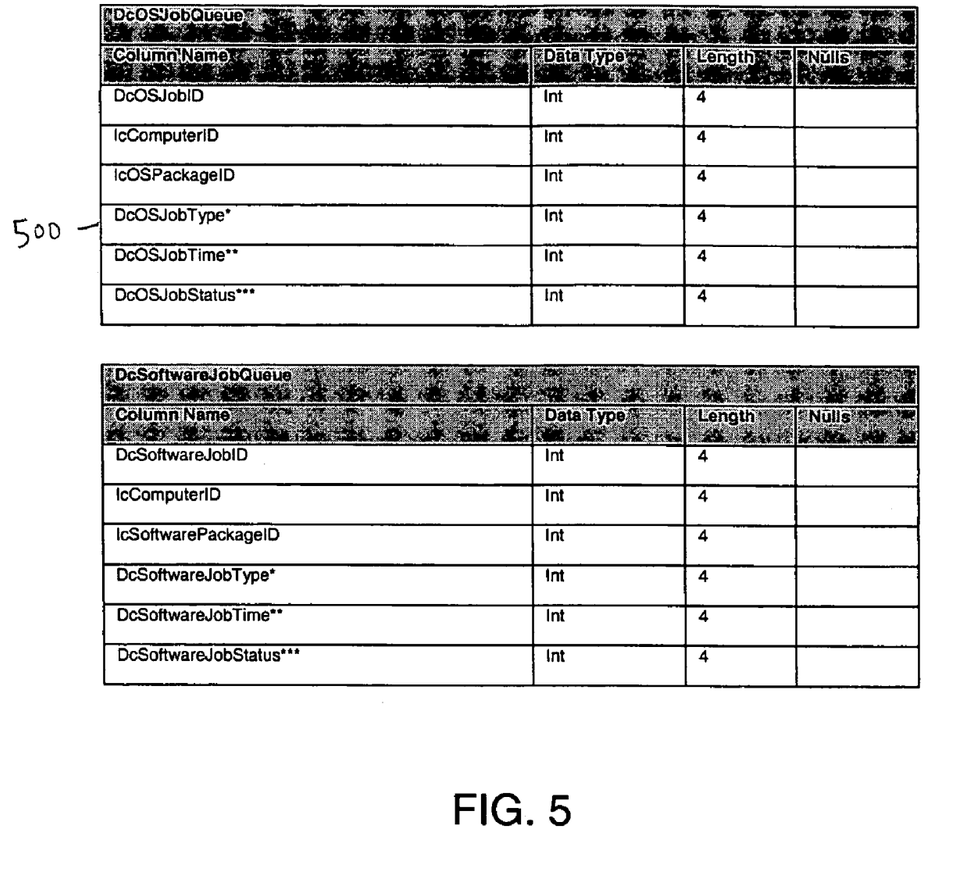
FIG. 5 is a diagram illustrating an outline of distribution control tables in accordance with an embodiment of the present invention.

The distribution engine database may comprise several database tables used to manage external update package jobs for distributions and update status information. FIG. 5 is a diagram illustrating an outline of distribution control tables in accordance with an embodiment of the present invention. The DcOSJobType field 500 may be a flag used to communicate to the system what type of updates this application takes. Choices may include automatic immediate, automatic default update time, manual update with notification, and manual update without notification.

A database 108, which may be a Structured Query Language (SQL) database, may provide for the storage of all information for each module within the IS platform. This may comprise all the databases described earlier. The database 108 also, through the use of stored procedures, may manage the comparison of data to assist the inventory control module 102 in identifying which client is ready to have an update applied.

The IS Platform is specifically designed to quickly and effectively apply and implement security updates across an organization's network. It provides key capabilities for detecting when computers are missing software updates, facilitates the distribution of these updates, and provides a complete status report to help ensure that all deliveries were successful.

The process may work as follows. First, the system administrator, in a one-time event, may configure the IS (or proceed with default settings), and perform an initial connection to the GUR. The system administrator may then install the IC on local machines, which then make an initial connection to the IS. The IC, through a regularly scheduled process, may then pass application and system information (e.g., via XML) to the IS. This information may include operating system information and version, installed software applications and versions, and network information.

The inventory control engine may then, through a regularly scheduled process (e.g., once a day), compare all the client information with existing external updates. If an update exists for a client, the inventory control engine may then flag the update package and client for a scheduled update. The update scheduler, triggered by the inventory control engine, may then queue a job for distribution. The IC may then connect to the IS through a regularly scheduled process to check for available distribution jobs. If a job is found, the IC may engage the IS to begin package information.

Once the installation is complete, the IC may notify the IS through the update status module that the installation was complete. The IC may also communicate to the IS if an update package failed to install. In the event of a power failure or other network disturbance, the IC is able to resume an installation process if necessary. Upon completion of the installation, the IC may also notify the inventory control engine of the new software update or new operating system version information, through the client status module. The IS may then validate the process and provide executive and technical reports based on the user defined set of requirements.

Figure 6:
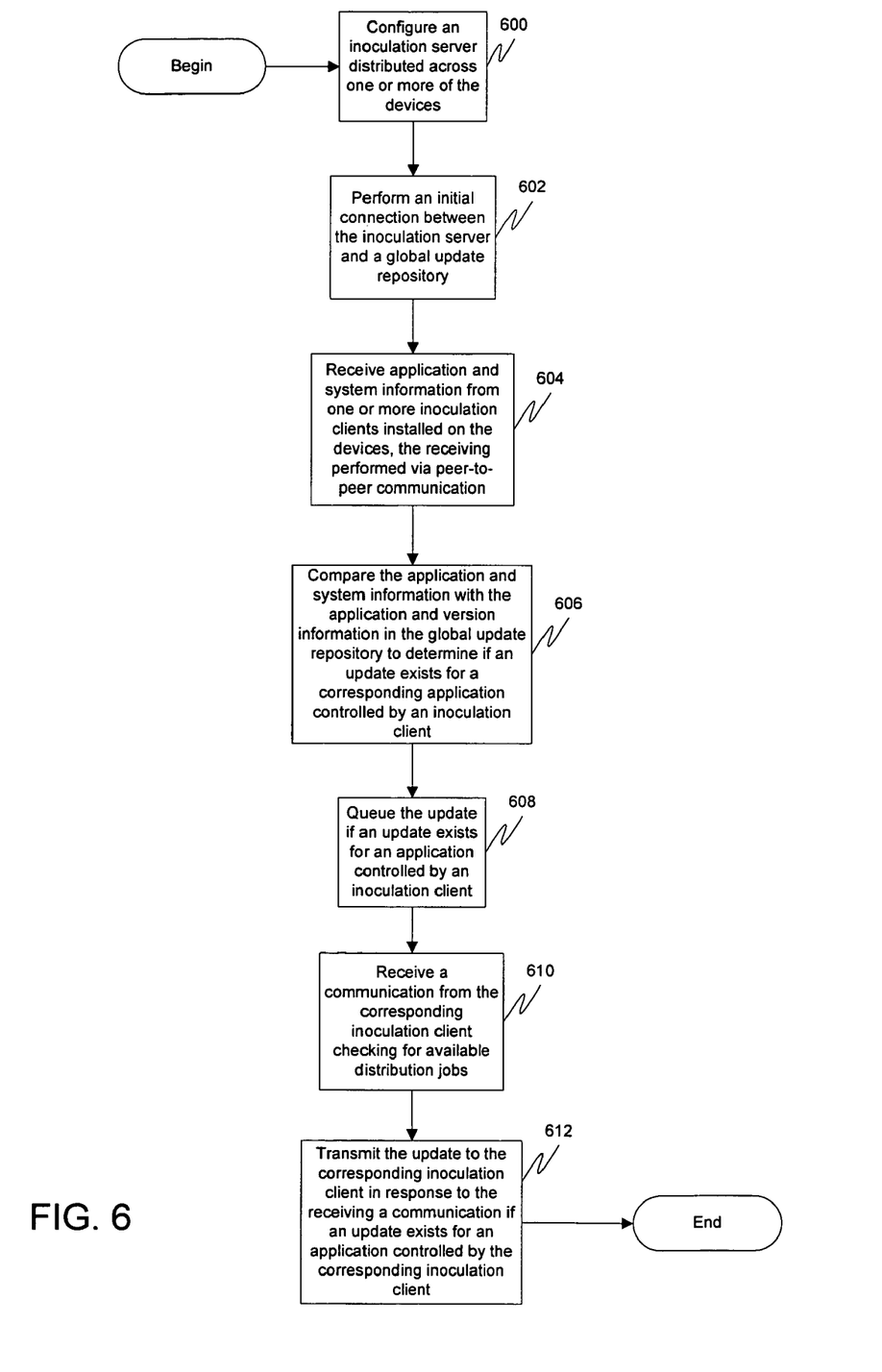
FIG. 6 is a flow diagram illustrating a method for automatically distributing a software update to a network of devices controlled by an organization in accordance with an embodiment of the present invention.

FIG. 6 is a flow diagram illustrating a method for automatically distributing a software update to a network of devices controlled by an organization in accordance with an embodiment of the present invention. At 600, an inoculation server distributed across one or more of the devices may be configured. At 602, an initial connection between the inoculation server and a global update repository may be performed. The global update repository is a centralized repository that manages operating systems and software to be delivered to inoculation servers. It may mine, retrieve, and archive external update information from external security websites using web spiders. The external update information may contain a vendor type, the vendor type being automatic download and release, automatic download and manually confirm release, or manually download and confirm. At 604, application and system information may be received from one or more inoculation clients installed on the devices, the receiving performed via peer-to-peer communication. The application and system information may include operating system information and version, software applications and versions, and network information. It may be received in XML format. At 606, the application and system information may be compared with application and version information in the global update repository to determine if an update exists for a corresponding application controlled by an inoculation client. This may include utilizing an HTTP GET or POST command and may be performed by an inventory control engine. At 608, the update may be queued if an update exists for an application controlled by an inoculation client. This may be performed by a distribution engine. At 610, a communication may be received from the corresponding inoculation client checking for available distribution jobs. At 612, the update may be transmitted to the corresponding inoculation client in response to the receiving a communication if an update exists for an application controlled by the corresponding inoculation client.

Figure 7:
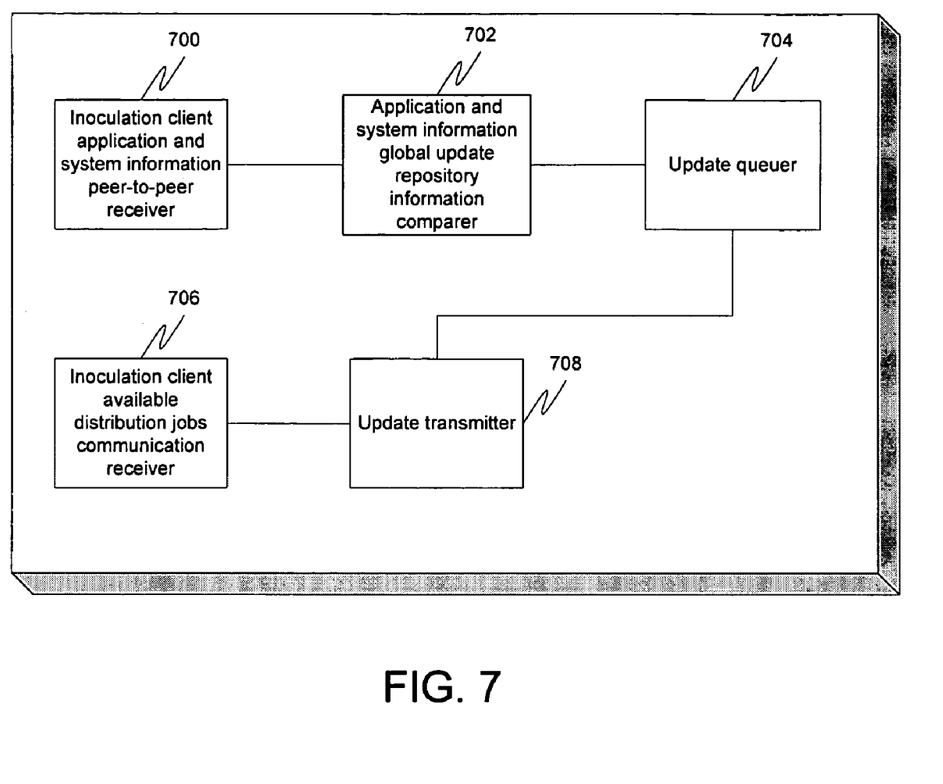
FIG. 7 is a block diagram illustrating an inoculation server for automatically distributing a software update to a network of devices controlled by an organization in accordance with an embodiment of the present invention.

FIG. 7 is a block diagram illustrating an inoculation server for automatically distributing a software update to a network of devices controlled by an organization in accordance with an embodiment of the present invention. The inoculation server may be distributed across one or more of the devices and may first be configured. Then, an initial connection between the inoculation server and a global update repository may be performed. The global update repository is a centralized repository that manages operating systems and software to be delivered to inoculation servers. It may mine, retrieve, and archive external update information from external security websites using web spiders. The external update information may contain a vendor type, the vendor type being automatic download and release, automatic download and manually confirm release, or manually download and confirm. An inoculation client application and system information peer-to-peer receiver 700 may receive application and system information from one or more inoculation clients installed on the devices, the receiving performed via peer-to-peer communication. The application and system information may include operating system information and version, software applications and versions, and network information. It may be received in XML format. An application and system information global update repository information comparer 702 coupled to the inoculation client application and system information peer-to-peer receiver 700 may compare the application and system information with application and version information in the global update repository to determine if an update exists for a corresponding application controlled by an inoculation client. This may include utilizing an HTTP GET or POST command and may be performed by an inventory control engine. An update queuer 704 coupled to the application and system information global update repository information comparer 702 may queue the update if an update exists for an application controlled by an inoculation client. This may be performed by a distribution engine. An inoculation client available distribution jobs communication receiver 706 may receive a communication from the corresponding inoculation client checking for available distribution jobs. An update transmitter 708 coupled to the update queuer 704 and to the inoculation client available distribution jobs communication receiver 706 may transmit the update to the corresponding inoculation client in response to the receiving a communication if an update exists for an application controlled by the corresponding inoculation client.

Communications between the various components in the architecture may be accomplished using a patch module and a web module. The patch module may cover communications between the inventory control, distribution control, and client control. The web module may cover communications between the user interface and the inventory control, distribution control, and client control.

The client and server may be built using self-contained modules. Each module is responsible for a distinct aspect of the program's behavior. All modules may communicate with a central module that properly dispatches requests and commands between modules. The modules execute independently of each other, and are stateless, which means that any order of requests or commands is handled correctly within each module. This makes the applications more efficient than a monolithic design.

The communication between the modules may be based on XML. Each data request or command may be an instance of a specific XML schema. The modules each understand a section of the schema, and discard any inappropriate communication. This simplifies the processing of data, for there are freely available tools for reading data in XML format, and it is easy to leverage these tools for custom XML schemas.

The execution of each module may follow a listen, process, respond path. In the listen step, the module may wait for communication from other modules (i.e., another module within the application, or an external entity such as the GUI, or the server if the module is in the client). When a message is received, it may then be validated for syntactic correctness and then passed on to the process stage. The process stage may first determine the grammatical correctness of the request (in part or in whole), and secondly dispatch the request, which may entail gathering data, forwarding the request, or performing some action such as making a request to a third module. The respond step is an optional step in which a response may be generated from the message received in the first step. A response is a message sent back to the module that sent the initial message. Modules do not wait for responses, thus a response generates a new execution cycle in the other module.

For example, assume a user interface requests available patches from a client. The user interface will first sent the request. Then the web module in the client may receive the message, validate its syntax and grammar, and send a request to the main module. The web module is now in the listen state. The client's main module may then receive the message from the web module, validates its syntax and grammar, and makes a request to the patch module for the list. The main module is now in the listen state. The patch module may then receive the request from the main module, gather the information, and reply to the main module. Following this, the main thread may pass the response from the patch module to the web module. Finally, the web module may forward the response to the user interface, and the transaction is complete.

Figure 8:
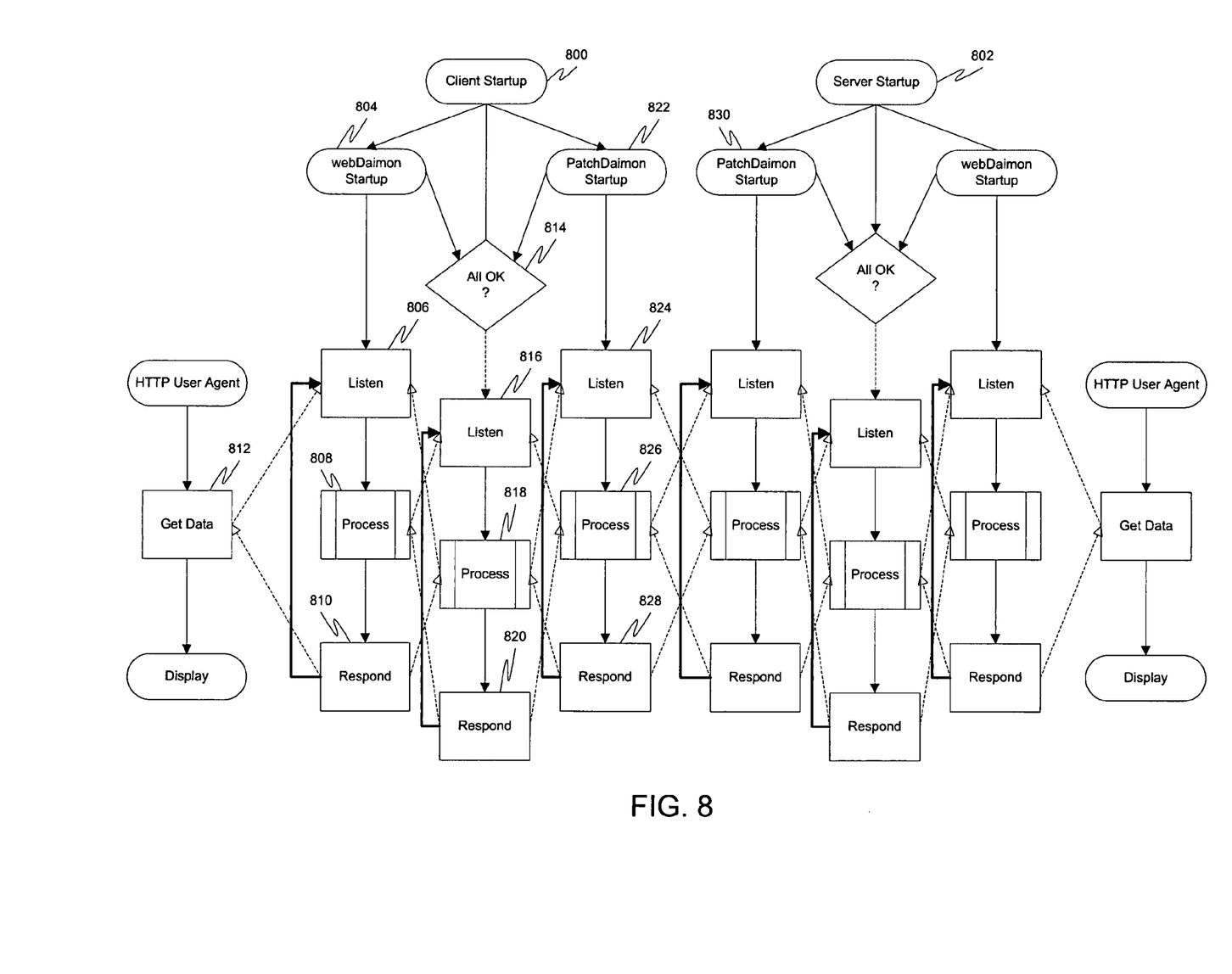
FIG. 8 is a diagram illustrating client-server data execution flow in accordance with an embodiment of the present invention.

FIG. 8 is a diagram illustrating client-server data execution flow in accordance with an embodiment of the present invention. Here, the client 800 and server 802 run independent threads. A web module thread 804 may have listen 806, process 808, and respond 810 steps, which may interface with a user interface 812 as well as with a main thread 814 also having listen 816, process 818, and respond 820 steps. Likewise, a patch module thread 822 may also have listen 824, process 826, and respond 828 steps, which interface with the main thread 814 and a patch thread 830 on the server 802.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for controlling communications in a system for automatically distributing a software update to a network of devices controlled by an organization, the method comprising:

receiving a first request for available updates from a user interface, the request received by a web module;

processing the first request on the web module;

sending a second request for available updates from the web module to a main module;

placing the web module in a listen state without waiting for a response to the second request;

processing the second request on the main module;

sending a third request for available updates from the main module to a patch module; placing the main module in a listen state without waiting for a response to the third request;

processing the third request on the patch module, the processing including examining a global update repository including updates from multiple application manufacturers;

sending a first reply with a list of available updates from the patch module to the main module;

sending a second reply with a list of available updates from the main module to the web module; and sending a third reply with a list of available updates from the web module to the user interface.

2. The method of claim 1, wherein the web module is in a listen state, process state, or respond state.

3. The method of claim 1, wherein the main module is in a listen state, process state, or respond state.

4. The method of claim 1, wherein the patch module is in a listen state, process state, or respond state.

5. The method of claim 1, wherein the web module, main module, and patch module are located on a client.

6. The method of claim 1, wherein the web module, main module, and patch module are located on a server.

7. The method of claim 5, wherein the patch module communicates with a patch module on a server.

8. The method of claim 6, wherein the patch module communicates with a patch module on a client.

9. The method of claim 1, wherein each of the requests is an Extensible Markup Language (XML) schema.

10. The method of claim 1, wherein each of the replies in an Extensible Markup Language (XML) schema.

11. The method of claim 2, wherein in the listen state, a module waits for communication with another module.

12. The method of claim 2, wherein in the process state, a module:

determines the grammatical correctness of a request; and generates a request.

13. The method of claim 2, wherein in the respond state, a module further generates a reply message.

14. The method of claim 3, wherein in the listen state, a module waits for communication with another module.

15. The method of claim 3, wherein in the process state, a module:

determines the grammatical correctness of a request; and generates a request.

16. The method of claim 3, wherein in the respond state, a module further generates a reply message.

17. The method of claim 1, further comprising:

validating the requests for syntactical correctness upon receipt by a module.

18. An apparatus for controlling communications in a system for automatically distributing a software update to a network of devices controlled by an organization, the apparatus comprising:

a memory;

a web module user interface request receiver;

a web module user interface request processor coupled to the web module user interface request receiver;

a web module request sender coupled to the web module user interface request processor;

a web module listen state placer coupled to the web module request sender and configured to place the web module in a listen state without waiting for a response to a request sent by the web module request sender;

a main module web module request processor coupled to the web module request sender;

a main module request sender coupled to the main module web module request processor;

a main module listen state placer coupled to the main module request processor configured to place the main module in a listen state without waiting for a response to a request sent by the main module request sender;

a patch module main module request processor coupled to the main module request sender and configured to examine a global update repository including updates from multiple application manufacturers;

a patch module reply sender coupled to the patch module main module request processor;

a main module reply sender coupled to the patch module reply sender; and a web module reply replay sender coupled to the main module reply sender.

19. The apparatus of claim 18, wherein the apparatus is located on a server.

20. The apparatus of claim 18, wherein the apparatus is located on a client.

21. An apparatus for controlling communications in a system for automatically distributing a software update to a network of devices controlled by an organization, the apparatus comprising:

a memory;

means for receiving a first request for available updates from a user interface, the request received by a web module;

means for processing the first request on the said web module;

means for sending a second request for available updates from the web module to a main module;

means for placing the web module in a listen state without waiting for a response to the second request;

means for processing the second request on the main module;

means for sending a third request for available updates from the main module to a patch module;

means for placing the main module in a listen state without waiting for a response to the third request;

means for processing the third request on the patch module, the processing including examining a global update repository including updates from multiple application manufacturers;

means for sending a first reply with a list of available updates from the patch module to the main module;

means for sending a second reply with a list of available updates from the main module to the web module; and means for sending a third reply with a list of available updates from the web module to the user interface.

22. The apparatus of claim 21, wherein the web module is in a listen state, process state, or respond state.

23. The apparatus of claim 21, wherein the main module is in a listen state, process state, or respond state.

24. The apparatus of claim 21, wherein the patch module is in a listen state, process state, or respond state.

25. The apparatus of claim 21, wherein the web module, main module, and patch module are located on a client.

26. The apparatus of claim 21, wherein the web module, main module, and patch module are located on a server.

27. The apparatus of claim 25, wherein the patch module communicates with a patch module on a server.

28. The apparatus of claim 26, wherein the patch module communicates with a patch module on a client.

29. The apparatus of claim 21, wherein each of the requests is an Extensible Markup Language (XML) schema.

30. The apparatus of claim 21, wherein each of the replies in an Extensible Markup Language (XML) schema.

31. The apparatus of claim 22, wherein in the listen state, a module waits for communication with another module.

32. The apparatus of claim 22, wherein in the process state, a module:

determines the grammatical correctness of a request; and generates a request.

33. The apparatus of claim 22, wherein in the respond state, a module further generates a reply message.

34. The apparatus of claim 23, wherein in the listen state, a module waits for communication with another module.

35. The apparatus of claim 23, wherein in the process state, a module:

determines the grammatical correctness of a request; and generates a request.

36. The apparatus of claim 23, wherein in the respond state, a module further generates a reply message.

37. The apparatus of claim 21, further comprising:

Validating the requests for syntactical correctness upon receipt by a module.

38. A program storage device readable by a machine, tangibly embodying a program of instructions executable by the machine to perform a method for controlling communications in a system for automatically distributing a software update to a network of devices controlled by an organization, the method comprising:

receiving a first request for available updates from a user interface, the request received by a web module;

processing the first request on the web module;

sending a second request for available updates from the web module to a main module;

placing the web module in a listen state without waiting for a response to the second request;

processing the second request on the main module;

sending a third request for available updates from the main module to a patch module;

placing the main module in a listen state without waiting for a response to the third request;

processing the third request on the patch module, the processing including examining a global update repository including updates from multiple application manufacturers;

sending a first reply with a list of available updates from the patch module to the main module;

sending a second reply with a list of available updates from the main module to the web module; and sending a third reply with a list of available updates from the web module to the user interface.

* * * * *